United States Patent
Tamura

[19]

[11] Patent Number: 6,061,571
[45] Date of Patent: May 9, 2000

[54] TELEPHONE SYSTEM CAPABLE OF UTILIZING TELEPHONE NUMBER INFORMATION STORED IN PARENT PORTABLE TELEPHONE UNIT BY A PLURALITY OF CHILD PORTABLE TELEPHONE UNITS

[75] Inventor: Hideo Tamura, Kanagawa, Japan

[73] Assignee: NEC Corporation, Tokyo, Japan

[21] Appl. No.: 09/014,580

[22] Filed: Jan. 28, 1998

[30] Foreign Application Priority Data

Jan. 28, 1997 [JP] Japan ................................. 9-014223

[51] Int. Cl.[7] ................................................... H04Q 7/20
[52] U.S. Cl. ........................... 455/463; 455/419; 455/426
[58] Field of Search ................................... 455/403, 414, 455/415, 418, 419, 426, 462, 463, 464, 507, 517, 550, 561, 564, 566, 575, FOR 115; 379/157, 167, 177, 201, 216, 355, 356

[56] References Cited

U.S. PATENT DOCUMENTS

| | | | |
|---|---|---|---|
| 4,864,599 | 9/1989 | Saegusa et al. | 455/463 |
| 5,475,736 | 12/1995 | Ito | 455/463 |
| 5,515,420 | 5/1996 | Urasaka et al. | 455/564 |
| 5,644,621 | 7/1997 | Yamashita et al. | 455/463 |
| 5,812,946 | 9/1998 | Nakabayashi et al. | 455/418 |
| 5,875,405 | 2/1999 | Honda | 455/564 |
| 5,930,703 | 7/1999 | Cairns | 455/418 |

FOREIGN PATENT DOCUMENTS

| | | |
|---|---|---|
| 58-187057 | 11/1983 | Japan . |
| 1-120990 | 5/1989 | Japan . |
| 3-250836 | 11/1991 | Japan . |
| 7-38957 | 2/1995 | Japan . |
| 7-87566 | 3/1995 | Japan . |
| 7-264294 | 10/1995 | Japan . |
| 8-181757 | 7/1996 | Japan . |
| 10-23133 | 1/1998 | Japan . |
| WO 93/17504 | 2/1993 | WIPO ........................... 455/FOR 115 |

*Primary Examiner*—Dwayne D. Bost
*Assistant Examiner*—Nay Maung
*Attorney, Agent, or Firm*—Sughrue, Mion, Zinn, Macpeak & Seas, PLLC

[57] ABSTRACT

In a telephone system, which is arranged by a parent telephone unit and a plurality of child telephone units capable of radio-communicating with the parent telephone unit, the parent telephone unit includes a telephone number data storage table for storing a plurality of telephone number data indicative of a plurality of telephone numbers commonly usable by the plurality of child telephone units. The parent telephone unit retrieves the telephone number data storage table in response to a telephone number retrieve command issued from each of the plural child telephone units, and outputs a retrieve result to such a child telephone unit which has issued the telephone number retrieve command. Each of the plural child telephone units issues the telephone number retrieve command as a retrieve command issuing child telephone unit. Each of the plural telephone units enters the retrieve result outputted from the parent telephone unit, and also outputs the entered retrieve result to a user of the retrieve command issuing child telephone unit.

16 Claims, 7 Drawing Sheets

| FRAME SYNC BIT (64bit) | COMMAND BIT (5bit) | CHILD UNIT NUMBER (2bit) | ☆ | DATA1 (64bit) | DATA2 (64bit) | DATA3 (64bit) | ERROR CORRECTION BIT (64bit) |
|---|---|---|---|---|---|---|---|
| F | C | A | | | | | FCS |

☆: DATA FRAME NUMBER (2bit)

Fig. 12

| | FRAME SYNC | COMMAND | CHILD UNIT NUMBER | DATA1 | DATA2 | DATA3 | ERROR CORRECTION BIT |
|---|---|---|---|---|---|---|---|
| | 64bit (REPETITION OF 0110, 1001, 1100 AND 0011 4 TIMES) | | 00: PARENT 01: CHILD1 10: CHILD2 11: CHILD3 | | | | ERROR CHECK FOR ALL BITS EXCEPT FOR FRAME SYNC CHECKING METHOD IS ARBITRARY |
| SIGNAL NAME | | COMMAND | | DATA1 | DATA2 | DATA3 | |
| Ha  IDENTIFICATION DEMAND | ☆ | 00010 | 01 | IDENTIFICATION NUMBER | — | — | |
| Hb  IDENTIFICATION NG | | 10010 | 00 | — | — | — | |
| Hc  IDENTIFICATION OK | | 10011 | 01 | IDENTIFICATION NUMBER | — | — | |
| Hd  RETRIEVE DEMAND | | 00100 | 11 | RETRIEVE CONDITION | RETRIEVE CONDITION | RETRIEVE CONDITION | |
| He  RETRIEVE RESPONSE | | 10101 | 11 | RETRIEVE RESULT | RETRIEVE RESULT | RETRIEVE RESULT | |
| Hf  ADDING DEMAND | | 00110 | 01 | IDENTIFICATION NUMBER | — | — | |
| Hg  ADDING NG | | 10110 | 01 | IDENTIFICATION NUMBER | — | — | |
| Hh  ADDING OK | | 10111 | 01 | IDENTIFICATION NUMBER | — | — | |
| Hi  ADDING CONFIRM | | 01000 | 01 | IDENTIFICATION NUMBER | — | — | |
| Ht  TELEPHONE COMMUNICATION | | 00000 | 11 | CONTENT OF TELEPHONE COMMUNICATION | CONTENT OF TELEPHONE COMMUNICATION | CONTENT OF TELEPHONE COMMUNICATION | |

TELEPHONE SYSTEM CAPABLE OF UTILIZING TELEPHONE NUMBER INFORMATION STORED IN PARENT PORTABLE TELEPHONE UNIT BY A PLURALITY OF CHILD PORTABLE TELEPHONE UNITS

BACKGROUND OF THE INVENTION

1. Field of the Invention

The present invention generally relates to a telephone system for utilizing an apparatus of storing telephone numbers. More specifically, the present invention is directed to a telephone system such that a plurality of telephone units utilize the apparatus for storing telephone numbers, corresponding to a parent appliance for these plural telephone units.

2. Description of the Related Art

Figure 1:
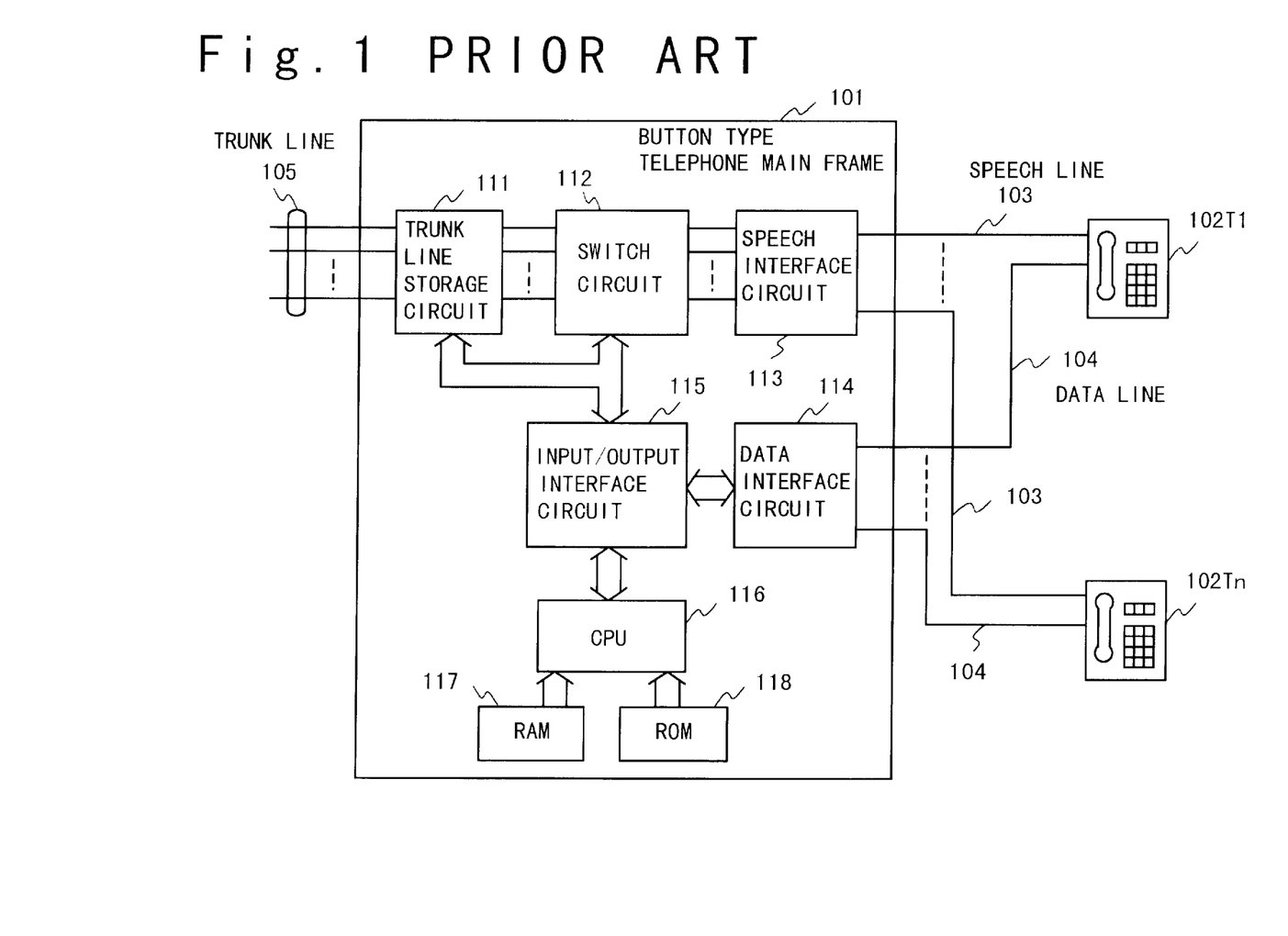
FIG. 1 is a schematic block diagram for representing the arrangement of the conventional telephone system.

FIG. 1 is a schematic block diagram for representing one example of the conventional telephone system disclosed in Japanese Laid-open Patent Application (JP-A-Heisei 1-120990). In FIG. 1, the identification numbers which are previously allocated to the respective telephone subscribers M1 to Mn of the telephone units 102T1 to 102Tn, a plurality of abbreviated dialing numbers corresponding to these identification numbers, the telephone numbers having an one-to-one corresponding relationship with these plural abbreviated dialing numbers have already been registered into the RAM 117.

When the subscriber M1 who usually makes a telephone call by using the telephone unit 102T1 will make a telephone call by utilizing another telephone unit 102Tn by the abbreviated dialing number, this subscriber M1 executes the below-mentioned operation. That is to say, after the telephone unit 102Tn is off-hooked, this subscriber M1 enters his identification number and the abbreviated dialing number corresponding to the telephone number of the counter party in this telephone communication by using the dialing buttons of this telephone unit 102Tn in accordance with a predetermined sequential operation.

The entered telephone data is sent from the telephone unit 102Tn via the data line 104 and then is received by the data interface circuit 114 of the button type telephone main frame (apparatus) 101. This entered telephone data is supplied via the input/output interface circuit 115 to the CPU 116.

When the CPU 116 decodes this telephone data and may judge that the abbreviated dialing number is commanded, this CPU 116 identifies the entered identification number contained in this telephone data with such an identification number previously stored in the RAM 117. As a result of this identifying operation, if the CPU 116 judges that the entered identification number is coincident with the previously stored identification number, then the CPU 116 seeks the storage area corresponding to this coincident identification number. Then, the CPU 116 seeks such a abbreviated dialing number which is coincident with the entered abbreviated dialing number among a plurality of abbreviated dialing numbers existed in this storage area. Also, the CPU 116 reads out such a telephone number corresponding to the relevant abbreviated dialing number in an one-to-one correspondence from the RAM 117. Thereafter, the CPU 116 sends the telephone number read from the RAM 117 via the input/output interface circuit 115 to the trunk line storage circuit 111.

The trunk line storage circuit 111 converts this telephone number into the dialing signal and then transmits this dialing signal to the trunk line 105.

As previously explained, in the above-described telephone system, the telephone numbers stored in the button type telephone main frame 101 are utilized by the button type telephone units 102T1 to 102Tn which are connected via the speech (voice) line 103 and the data line 104 to this button type telephone main frame 101. As a result, there is such a problem that the telephone numbers stored in the button type telephone main frame 101 could not be utilized even by the subscribers M1 to Mn who are authorized to use this button type telephone main frame 101 when these subscribers M1 to Mn try to telephone-access this button type telephone main frame 101 by employing such telephone units which are not connected via these telephone wire lines 103 and 104 to the button type telephone main frame 101.

On the other hand, in the conventional telephone system, the storage areas A1 to An into which a plurality of telephone numbers and the abbreviated dialing telephone numbers corresponding to these telephone numbers are registered are set with respect to each of the identification numbers of the subscribers M1 to Mn for the button type telephone main frame 101. Accordingly, there is another problem that these storage areas A1 to An could not be commonly shared by the plural subscriber M1 to Mn, for example, certain telephone subscribers M1 and M2 could not utilize such a storage area A3 which has been set to the identification number of another telephone subscriber M3. Also, when a new telephone subscriber "Mm" is additionally registered, a storage area "Am" for this new subscriber "Mm" should be newly set in the conventional telephone system.

Furthermore, a desirable telephone number itself could not be retrieved from the plural telephone numbers stored in the button type telephone main frame 101 in the conventional telephone system. As a consequence, there is another problem that when any telephone subscribers do not memorize the correct telephone number of the counter party, these subscribers could not read this correct telephone number from the button type telephone main frame 101.

Also, another telephone system is disclosed in Japanese Laid-Open Patent application (JP-A-Showa 58-187057). In this telephone system, a memory area of an abbreviated dialing information memory section is allocated to each telephone. This telephone system solves a problem that when the owner of the telephone uses another telephone, the service for abbreviated dial information which has been registered by the owner cannot be received, even if the other telephone is the telephone which is dealt with for the abbreviated dialing service. That is, because this system has an identification number registration means for every subscriber in the abbreviated dialing information memory section, the registered abbreviated dialing information for the owner can be used from a telephone of another person. More particularly, when the registered abbreviated dialing information for the owner is used from not the telephone of the owner but the telephone of the other person, the telephone number of the owner and an identification number thereof are sent to an switching apparatus. Thus, the abbreviated dial number subsequently sent is handled as the input from the originating user who is unrelated to the originating telephone (the telephone of the other person). In this manner, the abbreviated dialing call is made possible.

However, in the telephone system disclosed Japanese Laid-Open Patent Application (JP-A-Showa 58-187057), there is the same problem as in the telephone system disclosed in Japanese Laid-Open Patent Application (JP-A-Heisei 1-120990), that is, a problem in that the user cannot use the abbrebiated dialing service from the telephone which is not connected to the switching apparatus with a wired line, even if the user has the identification number.

Also, in this telephone system, a memory area is set to each identification number. Therefore, there is a problem in that the memory area can not be shared by a plurality of users (identification number owners).

Further, in this telephone system, since the telephone number cannot be searched, the telephone number cannot be used when the user does not correctly memorize the abbreviated dial number of the person to call.

Further, another telephone system is disclosed in Japanese Laid-Open Patent Application (JP-A-Heisei 3-250836). In this telephone system, a flag to validate or to invalidate each identification number can be provided for an abbreviated dial memory. Thus, each of the identification number corresponding to the telephone numbers which have previously registered on the abbreviated dial memory can be selectively made valid and invalid. Therefore, a specific identification number is selected with priority to make it possible to ring the call sound. Also, it is not necessary to delete an abbreviated dial number from the abbreviated dial memory when an identification number corresponding to the abbreviated dial number is made invalid and to re-register the abbreviated dial number.

However, even in this system, the problems which the telephone system which is disclosed in Japanese Laid-Open Patent Application (JP-A-Showa 58-187057) and Japanese Laid-Open Patent Application (JP-A-Heisei 1-120990) are not yet solved.

Also, another telephone system is disclosed in Japanese Laid-Open Patent application (JP-A-Heisei 8-181757). In this telephone system, when a magnetic card which abbreviated dial numbers and an identification number are written is inserted in a pay telephone, the identification number and the abbreviated dial numbers are sent from the pay telephone machine to a data base which an abbreviated dial numbers are registered on. The telephone numbers corresponding to the abbreviated dial numbers are sent to the pay telephone into which the magnetic card has been inserted. Therefore, it is possible to call from the pay telephone using an abbreviated dial number. A memo on which telephone numbers are written is unnecessary.

However, even in this system, too, any of the problems of the telephone systems which are disclosed in Japanese Laid-Open Patent application (JP-A-Showa 58-187057) and Japanese Laid-Open Patent Application (JP-A-Heisei 1-120990) are never solved.

SUMMARY OF THE INVENTION

The present invention is made to solve the problems in the conventional technique as mentioned above. An object of the present invention is to provide a telephone system capable of retrieving telephone number information stored in a telephone main frame by way of a remote manipulation.

Another object is to provide a telephone system capable of retrieving telephone numbers commonly usable stored in a telephone main frame.

Still another object is to provide a telephone system capable of retrieving a desirable telephone number from the plural telephone numbers stored in a telephone main frame.

In order to achieve an aspect of the present invention, a telephone system includes a parent telephone unit, a plurality of child telephone units capable of radio-communicating with the parent telephone unit, and the parent telephone unit includes a telephone number data storage table for storing a plurality of telephone number data indicative of a plurality of telephone numbers commonly usable by the plurality of child telephone units. Each of the plurality of child telephone units issues a telephone number retrieve command as an issuing child telephone unit, and the parent telephone unit searches the telephone number data storage table in response to the telephone number retrieve command issued from the issuing child telephone unit to output a searching result to the issuing child telephone unit. The issuing child telephone unit receives the searching result outputted from the parent telephone unit to output the received searching result to a user of the issuing child telephone unit.

In order to achieve another aspect of the present invention, in the telephone system, a specific identification number is allocated to each of the plurality of child telephone units, and the parent telephone unit includes an identification number data storage table which stores a plurality of data indicative of the specific identification numbers. The retrieve command contains the identification number data allocated to the issuing child telephone unit, and the parent telephone unit judges whether the identification number data outputted from the issuing child telephone unit is coincident with one of the plurality of identification number data stored in the identification number data storage table, and searches the telephone number data storage table in response to the retrieve command when it is judged that the identification number data outputted from the issuing child telephone unit is coincident with the identification number data stored in the identification number data storage table.

In order to achieve still another aspect of the present invention, in the telephone system, a specific child unit number is allocated to each of the plurality of child telephone units, wherein the identification number data storage table further stores therein a plurality of data indicative of the child unit numbers, wherein the retrieve command contains the child unit number data allocated to the issuing child telephone unit, in addition to the identification number data, wherein the parent telephone unit searches the identification number data storage table for the identification number data based on the child unit number contained in the retrieve command, judges whether the identification number data contained in the retrieve command is coincident with the searched identification number data corresponding to the child unit number contained in the retrieve command, and searches the telephone number data storage table for a desired telephone number in response to the retrieve command when it is judged that the identification number data contained in the retrieve command is coincident with the searched identification number data corresponding to the child unit number contained in the retrieve command. In order to achieve yet still another aspect of the present invention, in the telephone system, wherein the telephone number data storage table further stores therein an attribute data associated with each of the plurality of telephone numbers. The retrieve command contains the attribute data which is designated as a retrieve condition by the issuing child telephone unit and the parent telephone unit outputs as the searching result the telephone number corresponding to the attribute data contained in the retrieve command.

In this case, in the telephone system, wherein a single transfer channel is used to transfer communication data between the parent telephone unit and the issuing child telephone unit, and is used to transfer the retrieve command from the issuing child telephone unit to the parent telephone unit and the searching result from the parent telephone unit to the issuing child telephone unit.

Also in the telephone system, wherein another child telephone unit other than the plurality of child telephone units can be additionally provided with the telephone system comprised of the parent telephone unit and the plurality of child telephone units as a child telephone unit for constituting the telephone system.

In this case, the telephone system, wherein a specific identification number is allocated to each of the plurality of child telephone units, wherein the parent telephone unit further comprises an identification number data storage table which stores a plurality of data indicative of the specific identification numbers, a new child telephone unit other than the plurality of child telephone units can be additionally provided with the telephone system comprised of the parent telephone unit and the plurality of child telephone units as a child telephone unit for constituting the telephone system. The new child telephone unit issues as an additional command issuing child telephone unit an additional command. The additional command contains number data proposed as an identification number of the additional command issuing child telephone unit. The parent telephone unit judges whether the proposed identification number data contained in the additional command is coincident with one of the identification number data stored in the identification number data storage table, and permits the additional command when it is judged that the proposed identification number data contained in the additional command is not coincident with one of the identification number data stored in the identification number data storage table.

Also in this case, the telephone system wherein the attribute data contains at least one of a name of a destination associated with the searched telephone number, a company to which the destination belongs, an occupation of the destination, a business post of the destination in the company and an address of the destination.

Also a parent telephone unit capable of radio-communicating with a plurality of child telephone units, and wherein the parent telephone unit includes a telephone number data storage table for storing therein a plurality of telephone number data indicative of a plurality of telephone numbers commonly usable by the plurality of child telephone units. The parent telephone unit searches the telephone number data storage table in response to a telephone number retrieve command issued from each of the plurality of child telephone units to output a searching result to a child telephone unit which has issued the telephone number retrieve command.

In this case, the parent telephone unit wherein the telephone number data storage table further stores therein data which are provided with respect to each of the plurality of telephone number data and represent an attribute of each of the telephone numbers and the parent telephone unit outputs as the searching result the telephone number corresponding to the attribute data designated as a retrieve condition when the retrieve command is issued.

In this case, the parent telephone unit wherein a single transfer channel is used to transfer communication data between the parent telephone unit and the child telephone units, and used to transfer the retrieve command from the child telephone unit to the parent telephone unit and the searching result from the parent telephone unit to the child telephone unit.

Also a method for searching a telephone number, includes a step for issuing a telephone number retrieve command from each of a plurality of radio child telephone units, a step for searching a telephone number data storage table for storing therein a plurality of telephone number data indicative of a plurality of telephone numbers commonly usable by the plurality of child telephone units, in response to the retrieve command to thereby produce a searching result in a parent telephone unit and a step for outputting the searching result to the issuing child telephone unit.

In this case, the method for searching a telephone number, further includes a step for allocating a specific identification number to each of the plurality of radio child telephone units, a step for storing a plurality of data indicative of the specific identification numbers in the telephone number data storage table, a step for containing the identification number data in the retrieve command when the retrieve command is issued, a step for judging whether the identification number data contained in the retrieve command is coincident with one of the identification number data stored in the telephone number data storage table in the parent telephone unit, and a step for searching the telephone number data storage table in response to the retrieve command when it is judged that the identification number data contained in the retrieve command is coincident with the identification number data stored in the identification number data storage table.

Also the method for searching a telephone number, further includes a step for storing data indicative of each of attributes of the telephone number data, which are provided in correspondence with the respective telephone number data, in the telephone number data storage table, a step for containing the attribute data in the retrieve command when the retrieve command is issued and a step for concluding the searching result produced with reference to the telephone number data storage table in correspondence with the attribute data when responding to the retrieve command.

In this case, the method for searching a telephone number, further includes a step for providing another radio child telephone unit capable of issuing the retrieve command, other than the radio child telephone units.

Also in this case, the method for searching a telephone number, further includes a step for allocating a specific identification number to each of the plurality of radio child telephone units, a step for storing a plurality of data indicative of the specific identification numbers in the telephone number data storage table, a step for proposing a provision of another radio child telephone unit capable of issuing the retrieve command, other than the radio child telephone units, a step for outputting data indicative of a number proposed as the identification number of the proposing radio child telephone unit to the parent telephone unit, a step for judging whether one of the identification number data contained in the telephone number data storage table is coincident with the proposed identification number data, and a step for permitting the proposal when the proposed identification number data is not coincident with one of the identification number data stored in the telephone number data storage table.

BRIEF DESCRIPTION OF THE DRAWINGS

A more complete understanding of the teachings of the present invention may be acquired by referring to the accompanying figures, in which like reference numbers indicate like features and wherein.

DESCRIPTION OF THE PREFERRED EMBODIMENTS

Referring now to drawings, a telephone system according to an embodiment of the present invention will be described.

Figure 2:
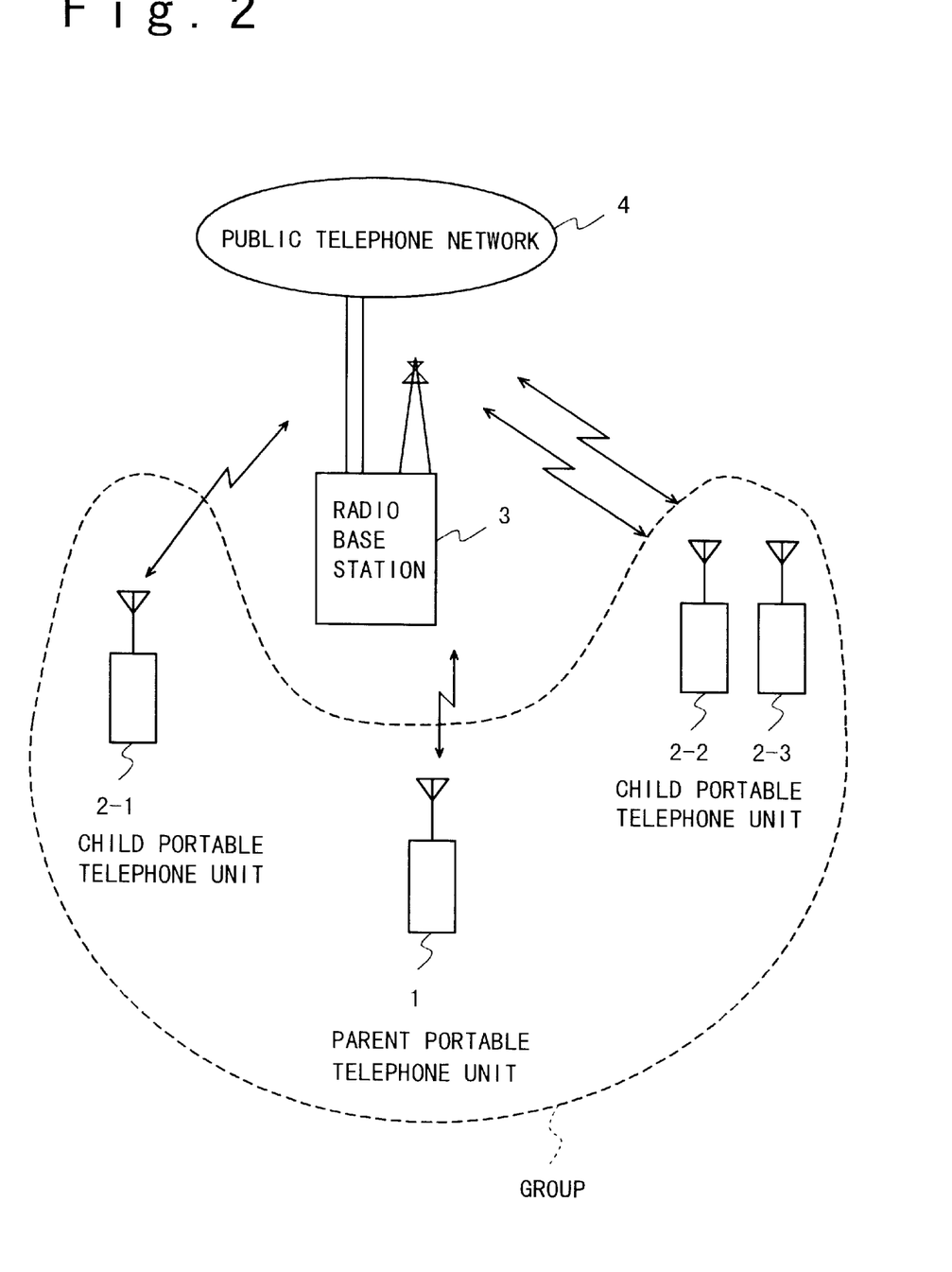
FIG. 2 is an illustration for showing an overall system structure of a telephone system according to an embodiment of the present invention.

FIG. 2 schematically shows an entire system arrangement of a telephone system according to one preferred embodiment of the present invention.

Figure 3:
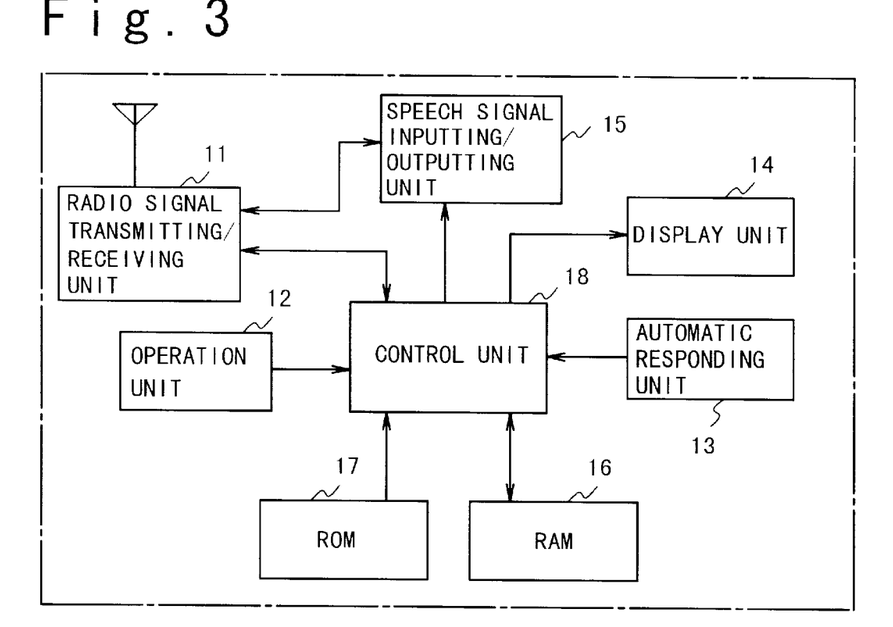
FIG. 3 is a schematic block diagram for indicating an arrangement of a parent unit of a portable telephone unit used in the telephone system of FIG. 2.
Figure 4:
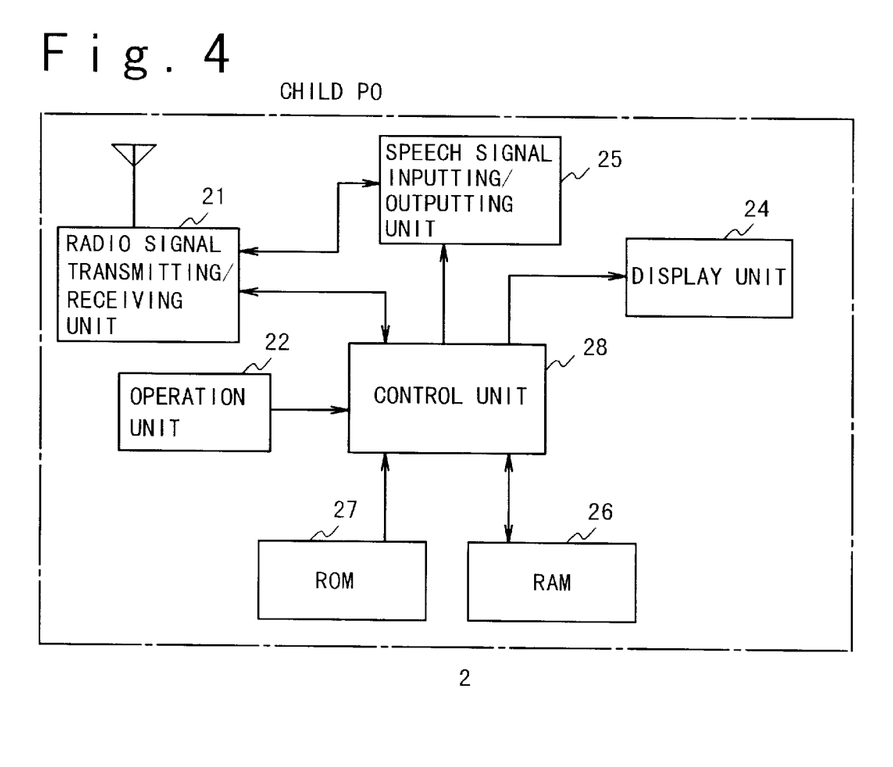
FIG. 4 is a schematic block diagram for representing an arrangement of a child unit of a portable telephone unit used in the telephone system of FIG. 2.

FIG. 3 is a schematic block diagram for indicating an internal arrangement of a parent unit of a portable telephone unit used in the telephone system of FIG. 2. FIG. 4 is a schematic block diagram for representing an internal arrangement of a child unit of a portable telephone unit used in the telephone system of FIG. 2.

As indicated in FIG. 2, the telephone system of this embodiment is composed of a parent portable telephone unit (parent unit) 1 and a plurality of child portable telephone units (child units) 2-1, 2-2, 2-3. Both the parent portable telephone unit 1 and the plural child telephone units 2-1, 2-2, 2-3 may constitute a group for the above-described telephone system.

The parent portable telephone 1 may establish a telephone communication with these child portable telephone units 2-1, 2-2, 2-3 for constituting the above-described group, and also telephone units (not shown) belonging to a group other than this group via a radio or wireless base station 3 connected to a public telephone network 4. The child portable telephone units 2-1, 2-2, 2-3 may establish telephone communications with the parent portable telephone unit 1 and the telephone unit of a group other than the first-mentioned group via the radio base station 3.

When a user of each of these child portable telephone units 2-1, 2-2, 2-3 does not know telephone number of a destination telephone unit, the child portable telephone unit 2-1, 2-2, 2-3 may issue a telephone number retrieve command to the parent portable telephone unit 1. Upon receipt of this telephone number retrieve command from the child issuing portable telephone unit, the parent portable telephone unit 1 retrieves a desirable telephone number from a plurality of telephone numbers stored therein in accordance with this retrieve command, and then returns the searching result, namely, a desirable telephone numbers to the issuing child portable telephone unit.

The issuing child portable telephone unit displays the searching result acquired from the parent portable telephone 1. The user of the issuing child portable telephone unit can acquire the desirable telephone number from the searching result displayed thereon, and can issue the telephone call by using the desirable telephone number after accomplishing the telephone communication with the parent portable telephone unit 1.

As indicated in FIG. 3, the parent portable telephone unit 1 used in the telephone system according to this embodiment is composed of a radio signal transmitting/receiving unit 11, an operation unit 12, an automatic responding unit 13, a display unit 14, a speech signal inputting/outputting unit 15, a RAM 16, a ROM 17, and a control unit 18.

The functions of the above-described structural elements employed in the parent portable telephone unit 1 will now be described. The radio signal transmitting/receiving unit 11 transmits and/or receives a radio or wireless speech signal and a radio control signal via the radio base station 3 to/from the respective child portable telephone units 2-1, 2-2, 2-3, and the telephone units (not shown in detail) of other groups.

The operation unit 12 is used to enter a dialing number and the like when a telephone call is made.

The automatic responding unit 13 automatically responds when a previously registered identification number is entered during call reception, and sends out a response message.

The display unit 14 displays a message and the like when a telephone call is received.

The speech signal inputting/outputting unit 15 inputs and/or outputs a speech signal when a telephone communication is established.

The RAM 16 temporarily stores a message and the like when a telephone call is received.

The control unit 18 controls the respective circuits employed in this parent portable telephone unit 1.

The ROM 17 previously stores identification numbers which have been allocated to each of the plural child portable telephone units 2-1, 2-2, 2-3 which have been registered to this parent portable telephone unit 1. When each of the child portable telephone units 2-1, 2-2, 2-3 is registered to the parent portable telephone unit 1, the above-described identification number may be determined by designating arbitrary number by the user of each of the child portable telephone units 2-1, 2-2, 2-3.

Also, this ROM 17 previously stores a plurality of telephone numbers which can be commonly used by the plural child portable telephone units 2-1, 2-2, 2-3, and also names corresponding to these commonly used telephone numbers. Furthermore, the ROM 17 previously stores a program used to retrieve these commonly used telephone numbers, and another program used to control the entire system of this parent portable telephone unit 1.

Figure 6:
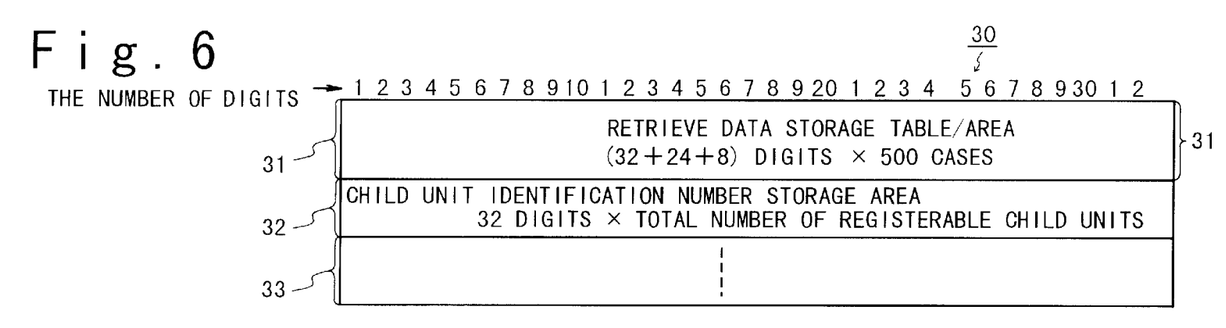
FIG. 6 schematically indicates contents of a storage table 30 of a ROM 17 employed in the parent portable telephone unit shown in FIG. 5.

FIG. 6 schematically indicates a content of a storage table 30 of the ROM 17.

As indicated in FIG. 6, the storage table 30 of the ROM 17 contains a telephone number retrieve data storage area 31, a child unit identification number storage area 32, and an other programs storage area 33.

Figure 7:
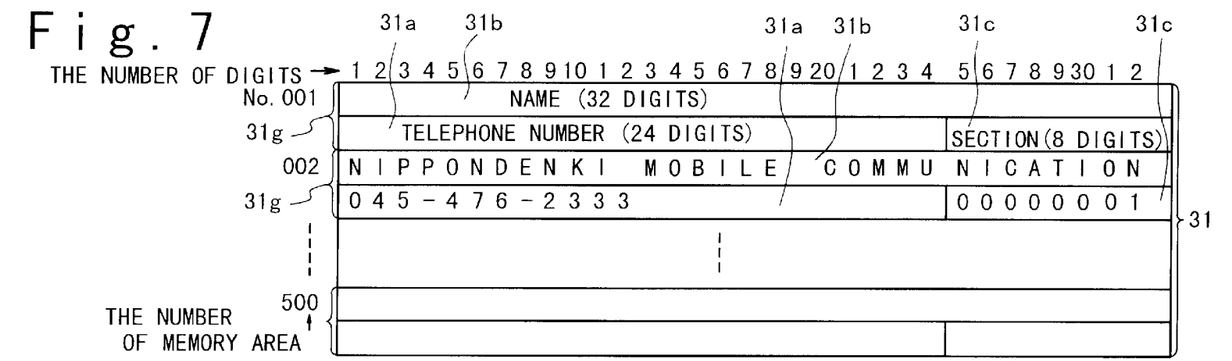
FIG. 7 schematically shows detailed contents of a telephone number retrieve data storage area 31 in the ROM 17.

FIG. 7 schematically shows a detail content of this telephone number retrieve data storage area 31 shown in FIG. 6. As indicated in FIG. 7, a plurality of telephone number data 31a commonly usable by the child portable telephone units 2-1, 2-2, 2-3; name data 31b indicative of the above-explained names; and section data 31c are stored in this telephone number retrieve data storage area 31. In the telephone number retrieve data storage area 31 according to this embodiment, for example, 500 sets of the telephone number data 31a may be registered in maximum.

It should be understood that a data length of the name data 31b is selected to be 32 digits; a data length of the telephone number data 31a is selected to be 24 digits; and a data length of the section data 31c is selected to be 8 digits.

In other words, a single memory area 31g is constituted by (32+24+8) digits, and then memory area numbers are given to the respective memory areas 31g. In this embodiment, such memory area numbers from 1 to 500 are applicable to these memory areas.

More specifically, the name data 31b is such data corresponding to, for example, a name of a counter party (company name, personal name, store name etc.) called by sending a telephone number indicated in the telephone number data 31a. In the example of FIG. 7, a company name "NIPPON DENKI MOBILE COMMUNICATION" is indicated. Furthermore, the name data 31b may be freely settable by a user. For example, when this name data is such a personal name "TANAKA", character data indicative of a business title of TANAKA may be added to head character data used in the telephone number retrieve operation. That is to say, when the business title of TANAKA is a manager, or a president, the resultant character data of TANAKA may be "MTANAKA", or "PTANAKA" in the telephone number retrieve operation.

The section data 31c indicates, for example, an occupation code, a company code, a region code, an alphabetical code, and so on. In the section data 31c having the data length of 8 digits, for instance, the company code is indicated at a first digit (32nd digit in FIG. 7) from the right side of the 8 digits. A description will now be made of this company code in such an assumption that each of these users for the above-explained child portable telephone units 2-1, 2-2, 2-3 belongs to the same company (will be referred to as a "company Co" hereinafter).

The telephone number data 31a indicative of the respective telephone numbers for plural departments belonging to the "company Co" are stored in a partial memory area 31g among the plural memory areas 31g of the telephone number retrieve data storage area 31. Then, "1" is written into the first digit from the right side of the section data 31c in each of the memory areas 31g into which the respective telephone number data 31a of the plural departments within the same company Co is stored. In other words, all of such plural memory areas 31g that "1" is written into the first digit from the right side may represent the respective telephone numbers of the departments within the company Co.

Also, in the plural memory areas 31g in which "2" is written into the first digit, telephone number data of plural companies are stored which correspond to material suppliers for this company Co. Similarly, in the plural memory areas 31g in which "3" is written into the first digit, telephone number data of plural companies are stored which correspond to selling companies for this company Co. Similarly, also, in the plural memory areas 31g in which "4" is written into the first digit, telephone number data of plural companies are stored which correspond to a plurality of financial institutions for this company Co. Similarly, telephone numbers of plural companies may be classified by writing any one of characters "5", "6", - - -, "9" and "10" for convenient use.

A second digit (31st digit) from the right side of the section data 31c indicates the occupation code, and a third digit (30th digit) from the right side thereof indicates the region code. Similarly, codes used in the retrieve operation may be applied to other digits subsequent to the fourth digit from the right side. In this case, the codes (company, occupation, region etc.) which are written as numeral data into the respective digits of the section data 31c may be selected as index capable of retrieving desirable telephone numbers from a plurality of telephone numbers.

Figure 8:
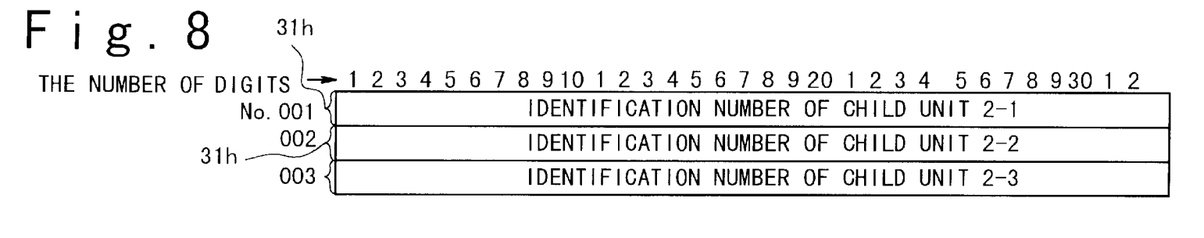
FIG. 8 schematically indicates contents of an identification number storage area 32 for the child portable telephone unit of the telephone system shown in FIG. 2.

As shown in FIG. 6 and FIG. 8, the identification number data of the child portable telephone units 2-1, 2-2, 2-3 are stored in the child unit identification number storage area 32. The data length of the identification number data is selected to be 32 digits. In other words, a single memory area 31h is constructed of 32 digits, and memory area numbers are given to the respective memory areas 31h. The identification numbers are provided with respect to each of the child portable telephone units 2-1, 2-2, 2-3 registered in the parent portable telephone unit 1. As a result, a total number of memory areas 31h in which the data (identification number data) are present and to which the memory area numbers are applied is coincident with a total quantity of the child portable telephone units 2-1, 2-2, 2-3 in the above-described child unit identification number storage area 32. In this embodiment, there are three memory areas 31h as well as three sets of the child portable telephone units 2-1, 2-2, 2-3.

Then, the above-described memory area numbers may directly constitute the child unit numbers of the child portable telephone units 2-1, 2-2, 2-3. It should be noted that the above-explained child unit numbers correspond to such numbers that are sequentially applied from the parent portable telephone unit 1 to the respective child portable telephone units 2-1, 2-2, 2-3 in accordance with the sequential order along which the child portable telephone units 2-1, 2-2, 2-3 are registered into the parent portable telephone unit 1. In other words, in this embodiment, the child unit number of the first-registered child portable unit 2-1 is equal to "1"; the child unit number of the second-registered child portable unit 2-2 is equal to "2"; and the child unit of the third-registered child portable unit 2-3 is equal to "3". These child unit numbers will be discussed later more in detail.

It should also be noted that in the storage table 30, the region into which a preselected number of child portable telephone units can be registered is allocated to the child unit identification storage area 32, and every time another child portable telephone unit is additionally registered, identification number data thereof is written into the memory area 31h.

On the other hand, as indicated in FIG. 4, each of child portable telephone units 2-1, 2-2, 2-3 employed in the telephone system according to this embodiment is constructed of a radio signal transmitting/receiving unit 21, an operation unit 22, a display unit 24, a speech signal transmitting/receiving unit 25, a RAM 26, and a ROM 27.

The functions of the above-described structural elements employed in a child portable telephone unit 2 (general number of 2-1, 2-2, 2-3) will now be described. The radio signal transmitting/receiving unit 21 transmits and/or receives a radio (wireless) speech signal and a radio control signal via the radio base station 3 to/from the parent portable telephone unit 1, and the portable telephone units (not shown in detail) of other groups.

The operation unit 22 equipped with a plurality of operating buttons enters a dialing number and a telephone number when a telephone call is made.

The display unit 24 displays a message, a retrieved telephone number, and a name of this telephone number when a telephone call is received.

The speech signal inputting/outputting unit 25 inputs and/or outputs a speech signal when a telephone communication is established.

The RAM 26 temporarily stores a message, a retrieved telephone number, and a name of the retrieved telephone number when a telephone call is received.

The ROM 27 previously stores a program used to retrieve the telephone numbers, and another program used to control the entire system of this child portable telephone unit 2.

The control unit 28 controls the respective circuits employed in this child portable telephone unit 2.

Referring now to a flow chart of FIG. 5, an overall operation (namely, telephone number retrieving operation) by the parent portable telephone unit 1 and the child portable telephone unit 2 employed in the telephone system according to this embodiment will be described.

Figure 5:
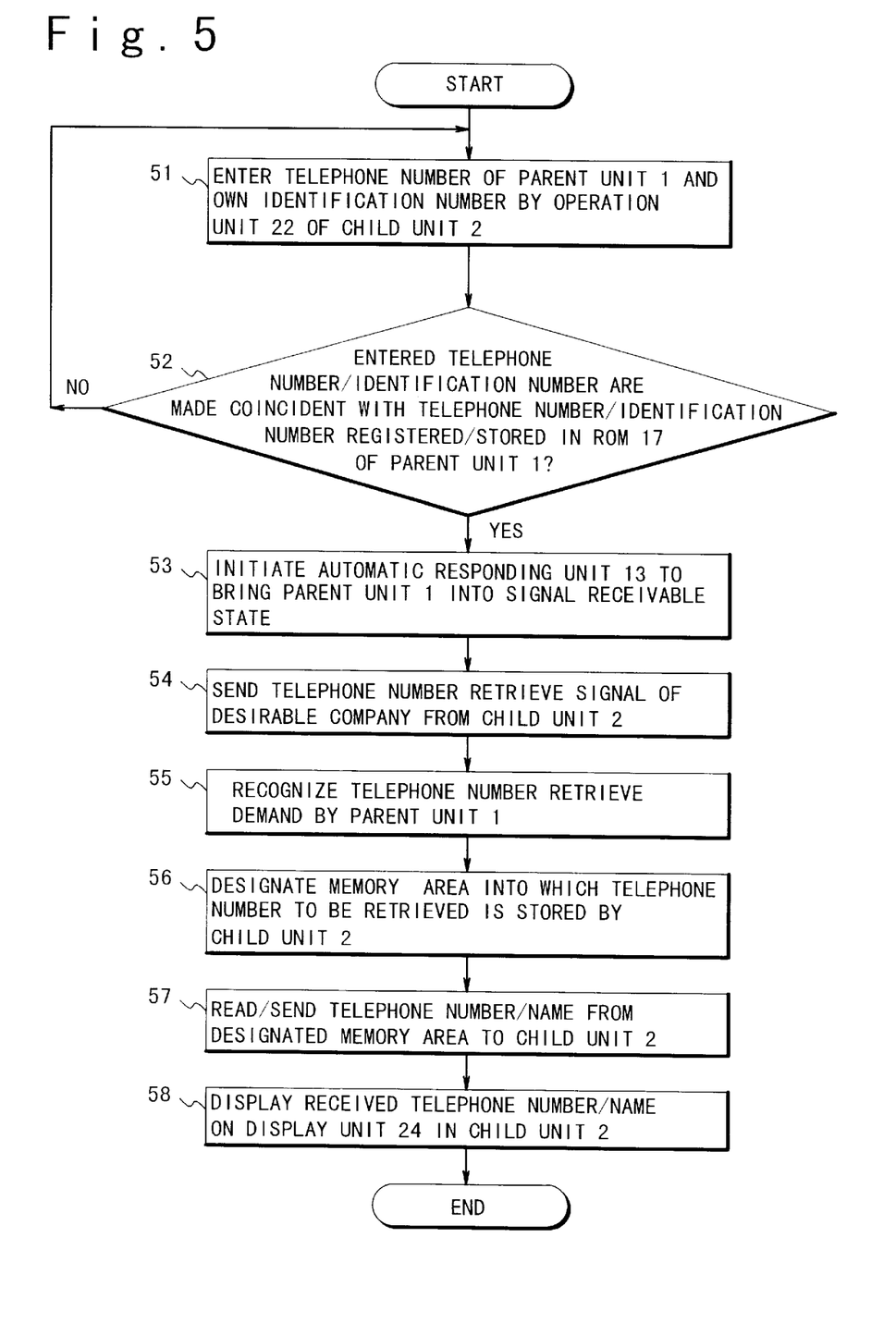
FIG. 5 is a flow chart for describing telephone number retrieving operation of the parent portable telephone unit employed in the telephone system of FIG. 2.

At a first step 51 of FIG. 5, a user enters the telephone number of the parent portable telephone unit 1, and the own identification number of the child portable telephone unit 2 by manipulating the operation unit 22 of this child portable telephone unit 2 (see FIG. 4).

At the next step 52, upon receipt of this telephone call from the child portable telephone unit 2, a check is made in this parent portable telephone unit 1 as to whether or not the entered telephone number/identification number are coincident with the telephone number/identification number which have been registered/stored into the ROM 17 of the parent portable telephone unit 1. If a judgment result is "NO" at this step 52, then the process operation is returned to the first step 51. Conversely, if it is so judged that the entered telephone number/identification number are coincident with those registered/stored into this ROM 17, then the process operation is advanced to a further step 53. At this step 53, the automatic responding unit 13 is initiated, so that this parent portable telephone unit 1 is brought into the signal receivable state.

At a step 54, a telephone number retrieve command signal is sent from the child portable telephone unit 2 to the parent portable telephone unit 1 in order to know the telephone number of, for example, a desirable company. Then at the next step 55, the parent portable telephone unit 1 recognizes that this command corresponds to the telephone number retrieve command. Thereafter, at a step 56, the child portable telephone unit 2 designates such a memory area into which the telephone number to be retrieved is stored (will be discussed later more in detail).

At a step 57, the parent portable telephone unit 1 reads the telephone number and the name stored in the designated memory area from the ROM 17, and then transmits both the read telephone number/name to the child portable telephone unit 2. At a final step 58, since the child portable telephone unit 2 displays the telephone number/name transmitted from the parent portable telephone unit 1 on the display unit 24, the user can acquire the telephone number/name of the desirable company.

The retrieving operations of the telephone numbers stored in the parent portable telephone unit 1 employed in the telephone system according to this embodiment will now be explained more in detail reference to FIG. 2 through FIG. 9.

Figure 9:
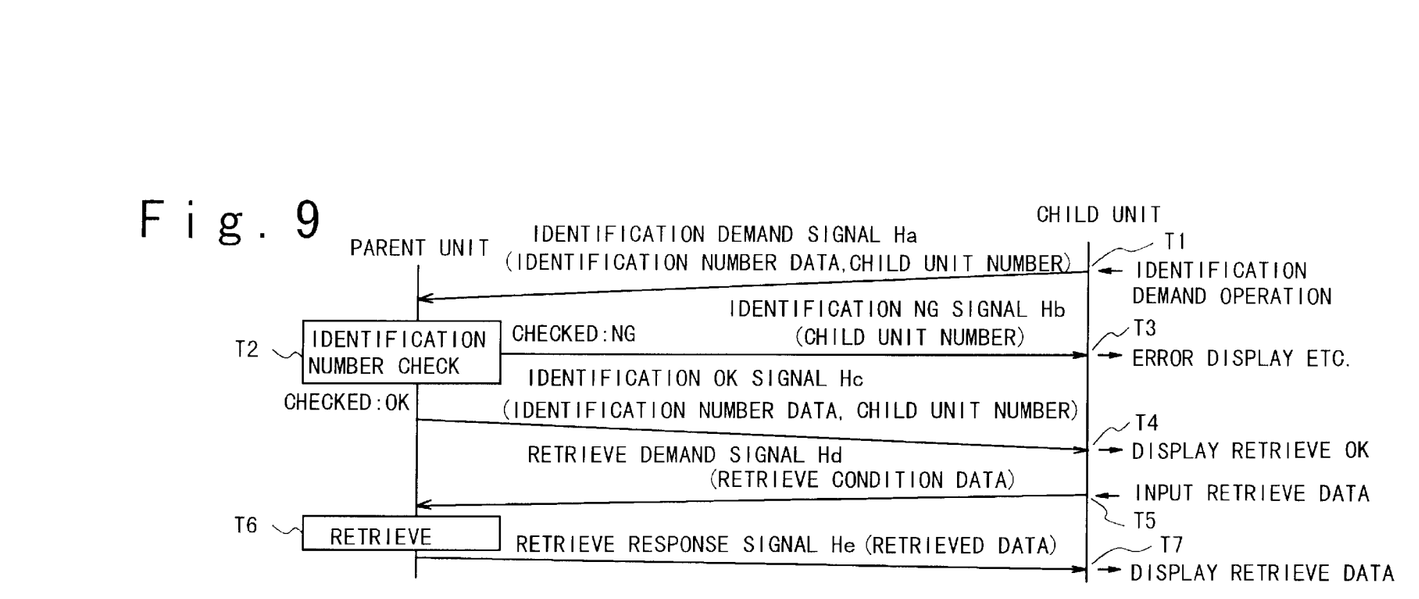
FIG. 9 and FIG. 10 illustratively explain dentification/retrieve operations between the parent portable telephone unit and the child portable telephone unit in the telephone system of FIG. 2.

For instance, in such a case that the user of the child portable telephone unit 2-1 tries to perform the telephone number retrieving operation under such a condition that this user knows a name of a counter party in this telephone communication, but does not know, or does not remember a telephone number of this counter party, the following telephone number retrieving operation is carried out:

(1). First of all, as indicated as "T1" of the flow operation shown in FIG. 9, the user of the child portable telephone unit 2-1 manipulates the operation unit 22 so as to send a telephone call to the parent portable telephone unit 1, and outputs an identification command signal "Ha" to the parent portable telephone unit 1 (identification command). In this case, the identification command signal Ha contains a child unit number signal involving the above-described child unit number "1" of this child portable telephone unit 2-1, and an identification number involving the above-explained identification number.

(2). Next, as indicated as T2 of FIG. 9, the memory area 31$h$ of the memory area number ("1" in this embodiment) within the ROM 17, equal to the above-explained child unit number indicated in the identification command signal Ha is referred by the control unit 18 of the parent portable telephone unit 1. Then, the control unit 18 judges as to whether or not the referred identification number stored in the memory area 31$h$ is coincident with the identification number indicated by the identification command signal Ha.

Then, after executing this judging operation, the automatic responding unit 13 of the parent portable telephone unit 1 is initiated to thereby output a signal indicative of the judgment result to the child portable telephone unit 2-1. In other words, when the control unit 18 judges that the identification number stored in the memory area 31$h$ is not coincident with the identification number indicated in the identification command signal Ha, the automatic responding unit 13 outputs an identification refuse signal Hb (at T3 of FIG. 9). To the contrary, when the control unit 18 judges that the identification number stored in the memory area 31$h$ is coincident with the identification number indicated in the identification command signal Ha, the automatic responding unit 13 outputs an identification permission signal Hc (at T4 of FIG. 9). Then, when the automatic responding unit 13 outputs the identification refuse signal Hb (at T3), only the child unit number "1" of this child telephone unit 2-1 is displayed on the display unit 24 of the child portable telephone unit 2-1, which may notify such a message "the entered identification number is error". To the contrary, when the automatic responding unit 13 outputs the identification permission signal Hc (at T4), both the child unit number "1" of the child portable telephone unit 2-1 and the identification number are displayed on the display unit 24, which may notify such a message "retrievable".

Also, when the automatic responding unit 13 outputs the identification permission signal Hc based on the judgment result by the control unit 18 (at T4), at the same time, the parent portable telephone unit 1 is brought into such a condition that a telephone number retrieve command signal Hd which will be subsequently transmitted can be received.

(3). When the identification permission signal Hc sent from the parent portable telephone unit 1 is received (at T4), the user of the child portable telephone unit 2-1 manipulates the operation unit 22 so as to execute the telephone number retrieving operation. That is, since the user depresses preselected operating buttons, e.g., "#", "0", and "1" of the operation unit 22, the telephone number retrieve command signal Hd is transmitted from the child portable telephone unit 2-1 to the parent portable telephone unit 1 (at T5). At this time, for instance, in such a case that the user of the child portable telephone 2-1 can grasp three items such as alphabetical name of a counter party in this telephone communication, an address (region) of this counter party, an occupation of this counter party, the child portable telephone unit 2-1 produces such a telephone number retrieve command signal Hd containing a retrieve condition, e.g., these three items are set to the AND condition. In this case, assuming now that the retrieve condition data of the three items are indicated by depressing the operating buttons of "*", "1", "2" and "3", the telephone number retrieve command signal Hd containing the retrieve condition data may be produced by depressing the operating buttons of "*", "1", "2", "3" subsequent to the above-described operating buttons of "#", "0" and "1" (at T5).

(4). Upon receipt of the above-explained telephone number retrieve command signal Hd, the control unit 18 of the parent portable telephone unit 1 refers to the content of the ROM 17 in order to confirm that this received signal is directed to request the telephone number retrieving operation (at T6). Then, this control unit 18 refers to the section data 31c of the telephone number retrieve data storage area 31 of the ROM 17 in order to retrieve the memory area 31g adapted to the retrieve condition of the three items. The control unit 18 sequentially reads the telephone number data 31a and the name data 31b stored in the retrieved memory area 31g, and then sequentially transmits these telephone number data 31a and name data 31b (at T7). In other words, a retrieve response signal He containing the retrieved telephone number data 31a and the retrieved name data 31b is produced, and then this retrieve response signal He is transmitted from the radio signal transmitting/receiving unit 11 toward the child portable telephone unit 2-1.

(5). After this retrieve response signal He is received by the control unit 21 of the child portable telephone unit 2-1, the control unit 28 causes the telephone number data and the name data, which are contained in the retrieve response signal He, to be stored into the RAM 26, and also to be displayed on the display unit 24 (at T7). When the wanted telephone number with respect to the name in question is displayed, the user of the child portable telephone 2-1 accomplishes the telephone communication with the parent portable telephone.

(6). The user of the child portable telephone unit 2-1 enters the desirable telephone number displayed on the display unit 24 by manipulating the operation unit 22, and transmits a calling signal to the desirable counter party having this retrieve name.

(7). Alternatively, instead of the above-explained process operation (6), the user of the child portable telephone unit 2-1 may depress the call issuing button of the operation unit 22, so that the child portable telephone unit 2-1 may issue such an instruction that the telephone number (namely, displayed telephone number) displayed on the display unit 24 is inputted. In other words, the operation unit 22 contains not only a so-called "ten key (first telephone number input unit)" capable of successively entering the numerals such as the telephone numbers, but also the above-explained call issuing button (second telephone number input unit). Since the call issuing button is depressed, the call issuing instruction of the above-described displayed telephone number is made. Upon receipt of this call issuing instruction, the control unit 28 reads the telephone number data displayed on the display unit 24 from the RAM 26, and then transmits a call issuing signal containing the above-described telephone number data from the radio signal transmitting/receiving unit 21. It should be understood that if a plurality of telephone numbers are displayed on the display unit 24, then any one of these telephone numbers may be selected by employing a cursor key so as to issue this selected telephone number.

Figure 10:
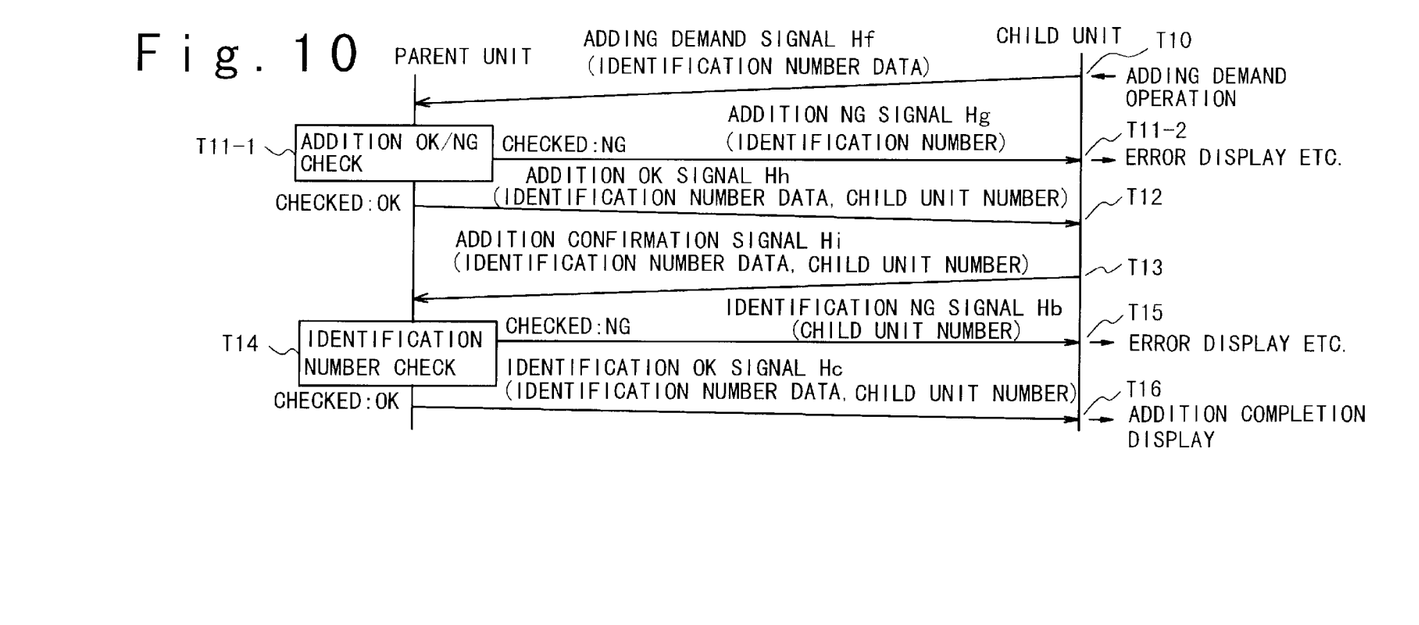

Next, referring now to a flow operation of FIG. 10, a description will be made of such a case that another child portable telephone unit is newly registered with respect to the group where the parent portable telephone unit 1 is used as a parent unit in the telephone system according to this embodiment.

Another child portable telephone unit (will be referred to as "2-4" hereinafter) which wishes to use the above-described telephone system of this embodiment while being registered into this above group will output an additional registeration command signal "Hf" to the parent portable telephone unit 1 (at T10). Into this additional registeration command signal Hf, identification number data is contained which represents such an identification number arbitrarily set by the user of this newly added child portable telephone 2-4. The control unit 18 of the parent portable telephone unit 1 which receives the additional registeration command signal Hf will refer to all of the identification number data (namely, all identification number data of child portable telephone units 2-1, 2-2, 2-3 in this embodiment) already present in the child unit identification number storage area 32 of the storage table 30. Then, the control unit 18 judges as to whether or not the identification number data contained in this additional registeration command signal Hf is coincident to each of the identification number data stored in the child unit identification number storage area 32 (at T11-1).

Then, after executing this judging operation, the automatic responding unit 13 of the parent portable telephone unit 1 is initiated to thereby output a signal indicative of the judgment result to the child portable telephone unit 2-4. In other words, when the control unit 18 judges that each of the identification numbers stored in the memory area 32 is coincident with the identification number contained in the additional registeration command signal Hf, the automatic responding unit 13 outputs an additional registration refuse signal Hg (at T11-2 of FIG. 10). To the contrary, when the control unit 18 judges that each of the identification numbers stored in the memory area 32 is not coincident with the identification number contained in the additional registeration command signal Hf, the automatic responding unit 13 outputs an additional registration permission signal Hh (at T12 of FIG. 10). When the automatic responding unit 13 outputs the additional registration refuse signal Hh (at T11), only such an identification number (namely, identification number set by user of this child portable telephone 2-4) corresponding to the identification number data contained in the adding command signal Hf outputted from the child portable telephone unit 2-4 at T10 is displayed on the display unit 24 of the child portable telephone unit 2-4. As a result, such a message "no additional registration is permitted" is notified. On the other hand, when the automatic responding unit 13 outputs the additional registration permission signal Hh (at T12), not only such an identification number corresponding to the identification number data contained in the adding command signal Hf outputted from the child portable telephone unit 2-4 at T10, but also the child unit number (4) are displayed on the display unit 24 of the child portable telephone unit 2-4. As a result, such a message "the identification number requested at T10 for the child portable telephone 2-4 is permitted, and also the child unit number of "4" is applied" is notified. It should be understood that the child unit number displayed at this time corresponds to the number which is applied in accordance with the registered sequence of this child portable telephone 2-4 (in this embodiment, "4"). At the same time, the identification number data contained in the adding command signal Hf at T10 is written into a new memory area 31h (namely, memory area 31h whose memory area number is equal to "4") in the child unit identification number storage area 32.

At T12, the user of the child portable telephone unit 2-4 who observes the displayed content of the display unit 24 outputs to the parent portable telephone unit 1, an additional registration confirmation signal "Hi" indicative of such a message "identification number and child unit number of child portable telephone unit 2-4 are confirmed by the user of the child portable telephone unit 2-4" (at T13).

The additional registration confirmation signal Hi contains both identification number data indicative of the identification number of the child portable telephone unit 2-4 and child unit number data representative of the child unit number. The control unit 18 of the parent portable telephone unit 1 which receives the additional registration confirmation signal Hi will refer to the memory area 31h of the memory area number having the same number "4" as the child unit number indicated by the child number data contained in this additional registration confirmation signal Hi. Then, the control unit 18 judges as to whether or not the identification number data of the referred memory area 31h is coincident with the identification number data contained in the additional registration confirmation signal Hi (at T14).

Then, after executing this judging operation, the automatic responding unit 13 of the parent portable telephone unit 1 is initiated to thereby output a signal indicative of the judgment result to the child portable telephone unit 2-4. In other words, when the control unit 18 judges that the identification number data stored in the referred memory area 31h is not made coincident with the identification number data contained in the additional registration confirmation signal Hi, the automatic responding unit 13 outputs an identification refuse signal Hb (at T15 of FIG. 10). To the contrary, when the control unit 18 judges that the identification number data stored in the referred memory area 31h is coincident with the identification number data contained in the additional registration confirmation signal Hi, the automatic responding unit 13 outputs an identification permission signal Hc (at T16 of FIG. 10). Then, at T15, only the above-described child unit number "4" is displayed on the display unit 24 of the child portable telephone unit 2-4, so that such a message is notified: That is, "the identification number data contained in the additional registration confirmation signal Hi is not coincident with the identification number data stored in the referred memory area 31h (namely, error)". On the other hand, at T16, both the child unit number "4" and further the identification number corresponding to the identification number data contained in the additional registration confirmation signal Hi are displayed on the display unit 24. Thus, another message "registration procedure of child portable telephone unit 2-4 is completed" is notified.

Figure 11:
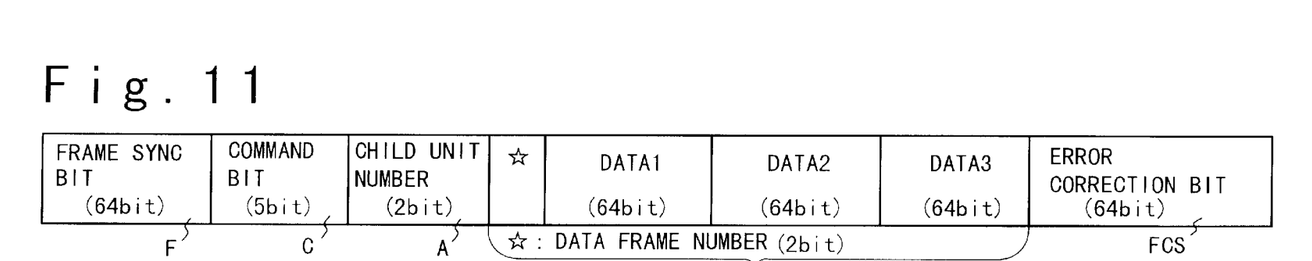
FIG. 11 schematically shows a frame structure of data transmitted/received between the parent portable telephone unit and the child portable telephone unit in the telephone system of FIG. 2.
Figure 12:
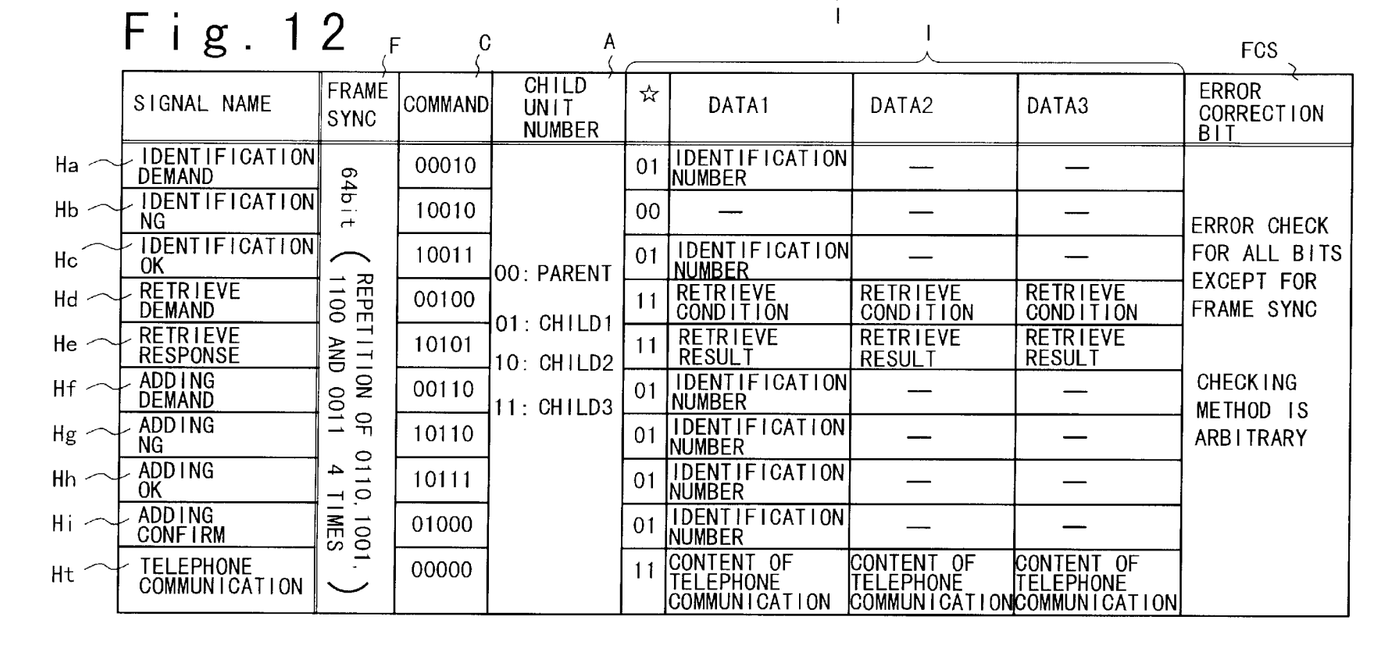
FIG. 12 schematically indicates contents of a field structure of the data transmitted/received the parent portable telephone unit and the child portable telephone unit in the telephone system of FIG. 2.

Next, various sorts of signals transmitted/received among the parent portable telephone unit 1 and the child portable telephone units 2-1, 2-2, 2-3 will now be explained. That is, as represented in FIG. 9 and FIG. 10, the identification command signal Ha, the identification refuse signal Hb, the identification permission signal Hc, the retrieve command signal Hd, the retrieve response signal He, the additional registration command signal Hf, the additional registration refuse signal Hg, the additional registration permission signal Hh, and the additional registration confirmation signal Hi are transmitted/received between the parent portable telephone unit 1 and the child portable telephone units. FIG. 11 represents frames corresponding to the above-explained various sorts of signals Ha, Hb, Hc, Hd, He, Hf, Hg, Hh and Hi. FIG. 12 indicates the respective fields of the above frame.

As indicated in FIG. 11, the above-explained frame is subdivided into a flag sequence F, a control field C, an address field A, an information field I, and a frame check sequence FCS from a head portion of this frame. Subsequent to this frame check sequence FCS, a flag sequence (namely, ending flag, not shown) is provided.

The flag sequence F owns a function of an identifier for notifying a start and an end of one frame, and also another function to establish a synchronization between the parent portable telephone unit 1 and the child portable telephone units 2-1, 2-2, 2-3. The flag sequence F has a 64-bit bit pattern, and the bit structure thereof are commonly used to the above-described various sorts of signals Ha, Hb, Hc, Hd, He, Hf, Hg, Hh, Hi. Concretely speaking, such a bit pattern "0110100111000011" is repeated four times.

The control field C is a portion indicative of a command of an operation and a response of an operation with respect to a counter party (telephone unit). The control field C has a 5-bit bit pattern, and bit structures thereof are different from each other with respect to the various sorts of signals Ha, Hb, Hc, Hd, He, Hf, Hg, Hh, Hi. That is, the bit structure of the identification command signal Ha is "00010". Similarly, the bit structure of the identification refuse signal Hb is "10010", and the bit structure of the identification permission signal Hc is "10011". The bit structure of the retrieve command signal Hd is "00100", the bit structure of the retrieve response signal He is "10101", and the bit structure of the additional registration command signal Hf is "00110", and the bit structure of the additional registration refuse signal Hg is "10110". The bit structure of the additional registration permission signal Hh is "10111", and also the bit structure of the additional registration confirmation signal Hi is "01000".

The address field A indicates either an address of a destination of a transmitted frame or an address of a source of a transmitted frame. Among the various sorts of signals Ha, Hb, Hc, Hd, He, Hf, Hg, Hh, and Hi, addresses of secondary stations (transmission destinations) which should receive signals belonging to the commands are set to these command signals, namely the identification command signal Ha, the retrieve command signal Hd, the additional registration command signal Hf, and the additional registration confirmation signal Hi. On the other hand, addresses of the transmission sources for indicating which secondary station transmits the signals belonging to the responses are set to these response signals, namely the identification refuse signal Hb, the identification permission signal Ha, the retrieve response signal He, the additional registration refuse signal Hg, and the additional registration permission signal Hh.

Assuming now that there are one parent portable telephone unit 1 and three child portable telephone unit 2, the address field A owns 2-bit bit patterns. Concretely speaking, as to the bit structures of the 2-bit bit patterns, "00" indicates the parent portable telephone unit 1; "01" denotes the first child portable telephone unit 2; "10" shows the second child portable telephone unit 2; and "11" represents the third child portable telephone unit 2.

The information field I corresponds to a field portion into which data is entered. This data should be transmitted, and contains control information, actual message information, and the like. The information field I contains data regions 1, 2, 3 into which three pieces of 64-bit data can be entered in maximum, and a 2-bit region for indicating that a total number of the above-mentioned data is equal to any one of 0 to 3. As to the identification command signal Ha, the identification number is entered into the data region 1, and a total number of data is equal to 1. As to the identification refuse signal Hb, a total number of data is equal to 0. As to the identification permission signal Hc, the identification number is entered into the data region 1, and a total number of data is equal to 1. As to the retrieve command signal Hd, the retrieve conditions are entered into the data regions 1, 2, 3, and a total number of data is equal to 3. As to the retrieve response signal He, the retrieve results are entered into the data regions 1, 2, 3, and a total number of data is equal to 3. The identification number is entered into the data region 1, and a total number of data is equal to 1 with respect to the additional registration command signal Hf, the additional registration refuse signal Hg, the additional registration permission signal Hh, and the additional registration confirmation signal Hi.

The frame check sequence FCS is located immediately before the ending flag, and corresponds to an error control flag used to confirm as to whether or not the contents of the control field C, the address field A, and the information field I are correctly transferred. Based on the frame check sequence FCS, the errors of all bits except for the frame synchronization of the flag sequence F are checked. The checking method may be arbitrary selected.

It should be noted that the normal telephone communications can be apparently carried out among the parent portable telephone unit 1 and the child portable telephone units 2-1, 2-2, 2-3 in addition to the telephone number retrieving operations as previously explained in the items (1) to (7). In this case, telephone communication signals (see symbol "Ht" in FIG. 12) which are transmitted/received among the parent portable telephone unit 1 and the child portable telephone units 2-1, 2-2, 2-3 are transferred via the same single channel (namely, communication path, and line) used for the above-explained various sorts of signals Ha, Hb, Hc, Hd, He, Hf, Hg, Hh, and Hi. In other words, as indicated in FIG. 12, as to this telephone communication signal Ht, a bit structure of a control field C thereof is selected to be "00000", contents of the telephone communication signal are entered into data regions 1, 2, 3 of an information field I thereof, and a total number of data becomes 3.

As previously described in detail, in accordance with the telephone system of this embodiment, even when the users of the child portable telephone units 2-1, 2-2, 2-3 do not know or remember the telephone numbers or the names of the counter parties, these users can retrieve the desirable telephone numbers or the desirable names stored in the parent portable telephone unit 1 belonging to the same group by way of the remote retrieve manner. As a consequence, the child portable telephone units 2-1, 2-2, 2-3 may be composed of employing such a small capacity memory, namely the ROM 27, capable of storing the minimum quantity of the telephone numbers.

In the foregoing description, when the telephone number stored in the parent portable telephone unit 1 is retrieved, the user has entered the memory area number of the parent portable telephone unit 1 by using the operation unit 22 of the child portable telephone unit 2-1. Alternatively, the present invention is not limited to this telephone number retrieving method, but may be modified as follows. That is, while the operating buttons of the operation unit 22 of the child portable telephone unit 2-1 are manipulated by a preselected combination, a desirable full name and/or a desirable abbreviated name of a counter party is entered by way of an alphabet, or a KATAKANA character, so that a telephone number corresponding to the entered desirable name may be retrieved.

As previously explained in detail, according to the telephone system of the present invention, there is an advantage that any of the plural child portable telephone units can freely acquire the telephone number information stored in the parent portable telephone unit.

Moreover, there is another advantage that since the respective child portable telephone units a memory having a small capacity capable of storing the minimum quantity of telephone numbers, these child portable telephone units can be made compact.

What is claimed is:

1. A telephone system comprising:

a parent telephone unit; and a plurality of child telephone units capable of radio-communicating with said parent telephone unit, wherein said child telephone units are connected to said parent telephone unit through a public telephone network, wherein said parent telephone unit includes a telephone number data storage table for storing therein a plurality of telephone number data indicative of a plurality of telephone numbers commonly usable by said plurality of child telephone units, wherein each of said plurality of child telephone units issues a telephone number retrieve command as an issuing child telephone unit, wherein said parent telephone unit searches said telephone number data storage table in response to said telephone number retrieve command issued from said issuing child telephone unit to output a searching result to said issuing child telephone unit, wherein said issuing child telephone unit receives said searching result outputted from said parent telephone unit to output said received searching result to a user of said issuing child telephone unit.

2. A telephone system according to claim 1, wherein a single transfer channel is used to transfer communication data between said parent telephone unit and said issuing child telephone unit, and is used to transfer said retrieve command from said issuing child telephone unit to said parent telephone unit and said searching result from said parent telephone unit to said issuing child telephone unit.

3. A telephone system according to claim 1, wherein another child telephone unit other than said plurality of child telephone units can be additionally provided with said telephone system comprised of said parent telephone unit and said plurality of child telephone units as a child telephone unit for constituting said telephone system.

4. A telephone system according to claim 1, wherein a specific identification number is allocated to each of said plurality of child telephone units, wherein said parent telephone unit further comprises an identification number data storage table which stores a plurality of data indicative of said specific identification numbers, a new child telephone unit other than said plurality of child telephone units can be additionally provided with said telephone system comprised of said parent telephone unit and said plurality of child telephone units as a child telephone unit for constituting said telephone system;

said new child telephone unit issues, as an additional command issuing child telephone unit, an additional command;

said additional command contains number data proposed as an identification number of said additional command issuing child telephone unit; and said parent telephone unit judges whether said proposed identification number data contained in said additional command is coincident with one of said identification number data stored in said identification number data storage table, and permits said additional command when it is judged that said proposed identification number data contained in said additional command is not coincident with one of said identification number data stored in said identification number data storage table.

5. A telephone system comprising:

a parent telephone unit, and a plurality of child telephone units capable of radio-communicating with said parent telephone unit, wherein said parent telephone unit includes a telephone number data storaer storing therein a plurality of telephone number data indicative of a plurality of telephone numbers commonly usable by said plurality of child telephone units, wherein each of said plurality of child telephone units issues a telephone number retrieve command as an issuing child telephone unit, wherein said parent telephone unit searches said telephone number data storage table in response to said telephone number retrieve command issued from said issuing child telephone unit to output a searching result to said issuing child telephone unit, wherein said issuing child telephone unit receives said searching result outputted from said parent telephone unit to output said received searching result to a user of said issuing child telephone unit, wherein a specific identification number is allocated to each of said plurality of child telephone units, wherein said parent telephone unit further comprises an identification number data storage table which stores a plurality of data indicative of said specific identification numbers, wherein said retrieve command contains said identification number data allocated to said issuing child telephone unit, wherein said parent telephone unit judges whether said identification number data outputted from said issuing child telephone unit is coincident with one of said plurality of identification number data stored in said identification number data storage table, and searches said telephone number data storage table in response to said retrieve command when it is judged that said identification number data outputted from said issuing child telephone unit is coincident with said identification number data stored in said identification number data storage table.

6. A telephone system according to claim 5, wherein a specific child unit number is further allocated to each of said plurality of child telephone units, wherein said identification number data storage table further stores therein a plurality of data indicative of said child unit numbers, wherein said retrieve command contains said child unit number data allocated to said issuing child telephone unit, in addition to said identification number data, wherein said parent telephone unit searches said identification number data storage table for said identification number data based on said child unit number contained in said retrieve command, judges whether said identification number data contained in said retrieve command is coincident with said searched identification number data corresponding to said child unit number contained in said retrieve command, and searches said telephone number data storage table for a desired telephone number in response to said retrieve command when it is judged that said identification number data contained in said retrieve command is coincident with said searched identification number data corresponding to said child unit number contained in said retrieve command.

7. A telephone system comprising:

a parent telephone unit, and a plurality of child telephone units capable of radio-communicating with said parent telephone unit, wherein said parent telephone unit includes a telephone number data storage table for storing therein a plurality of telephone number data indicative of a plurality of telephone numbers commonly usable by said plurality of child telephone units, wherein each of said plurality of child telephone units issues a telephone number retrieve command as an issuing child telephone unit, wherein said parent telephone unit searches said telephone number data storage table in response to said telephone number retrieve command issued from said issuing child telephone unit to output a searching result to said issuing child telephone unit, wherein said issuing child telephone unit receives said searching result outputted from said parent telephone unit to output said received searching result to a user of said issuing child telephone unit, wherein said telephone number data storage table further stores therein an attribute data associated with each of said plurality of telephone numbers;

said retrieve command contains said attribute data which is designated as a retrieve condition by said issuing child telephone unit; and said parent telephone unit outputs as said searching result said telephone number corresponding to said attribute data contained in said retrieve command.

8. A telephone system according to claim 7, wherein said attribute data contains at least one of a name of a destination associated with said searched telephone number, a company to which the destination belongs, an occupation of the destination, a business post of the destination in the company and an address of the destination.

9. A parent telephone unit capable of radio-communicating with a plurality of child telephone units, wherein said child telephone units are connected to said parent telephone unit through a public telephone units;

wherein said parent telephone unit includes a telephone number data storage table for storing there in a plurality of telephone number data indicative of a plurality of telephone numbers commonly usable by said plurality of child telephone units;

said parent telephone unit searches said telephone number data storage table in response to a telephone number retrieve command issued from each of said plurality of child telephone units to output a searching result to a child telephone unit which has issued said telephone number retrieve command.

10. A parent telephone unit according to claim 9, wherein said telephone number data storage table further stores therein data which are provided with respect to each of said plurality of telephone number data and represent an attribute of each of said telephone numbers; and said parent telephone unit outputs as said searching result said telephone number corresponding to said attribute data designated as a retrieve condition when said retrieve command is issued.

11. A parent telephone unit according to claim 9, wherein a single transfer channel is used to transfer communication data between said parent telephone unit and said child telephone units, and used to transfer said retrieve command from said child telephone unit to said parent telephone unit and said searching result from said parent telephone unit to said child telephone unit.

12. A method for searching a telephone number, comprising:

issuing a telephone number retrieve command from each of a plurality of radio child telephone units;

searching a telephone number data storage table for storing therein a plurality of telephone number data indicative of a plurality of telephone numbers commonly usable by said plurality of child telephone units, in response to said retrieve command to thereby produce a searching result in a parent telephone unit; and outputting said searching result to said issuing child telephone unit;

wherein said child telephone units communicate with said parent telephone unit through a public telephone network.

13. A method for searching a telephone number according to claim 12, further comprising:

providing another radio child telephone unit capable of issuing said retrieve command, other than said radio child telephone units.

14. A method for searching a telephone number comprising:

issuing a telephone number retrieve command from each of a plurality of radio child telephone units;

searching a telephone number data storage table for storing therein a plurality of telephone number data indicative of a plurality of telephone numbers commonly usable by said plurality of child telephone units, in response to said retrieve command to thereby produce a searching result in a parent telephone unit;

outputting said searching result to said issuing child telephone unit;

allocating a specific identification number to each of said plurality of radio child telephone units;

storing a plurality of data indicative of said specific identification numbers in said telephone number data storage table;

containing said identification number data in said retrieve command when said retrieve command is issued; and judging whether said identification number data contained in said retrieve command is coincident with one of said identification number data stored in said telephone number data storage table in said parent telephone unit; and searching said telephone number data storage table in response to said retrieve command when it is judged that said identification number data contained in said retrieve command is coincident with said identification number data stored in said identification number data storage table.

15. A method for searching a telephone number comprising:

issuing a telephone number retrieve command from each of a plurality of radio child telephone units;

searching a telephone number data storage table for storing therein a plurality of telephone number data indicative of a plurality of telephone numbers commonly usable by said plurality of child telephone units, in response to said retrieve command to thereby produce a searching result in a parent telephone unit;

outputting said searching result to said issuing child telephone unit;

storing data indicative of each of attributes of said telephone number data, which are provided in correspondence with said respective telephone number data, in said telephone number data storage table;

containing said attribute data in said retrieve command when said retrieve command is issued; and concluding said searching result produced with reference to said telephone number data storage table in correspondence with said attribute data when responding to said retrieve command.

16. A method for searching a telephone number comprising:

issuing a telephone number retrieve command from each of a plurality of radio child telephone units;

searching a telephone number data storage table for storing therein a plurality of telephone number data indicative of a plurality of telephone numbers commonly usable by said plurality of child telephone units, in response to said retrieve command to thereby produce a searching result in a parent telephone unit;

outputting said searching result to said issuing child telephone unit;

allocating a specific identification number to each of said plurality of radio child telephone units;

storing a plurality of data indicative of said specific identification numbers in said telephone number data storage table;

proposing a provision of another radio child telephone unit capable of issuing said retrieve command, other than said radio child telephone units;

outputting data indicative of a number proposed as said identification number of said proposing radio child telephone unit to said parent telephone unit; and judging whether one of said identification number data contained in said telephone number data storage table is coincident with said proposed identification number data;

permitting said proposal when said proposed identification number data is not coincident with one of said identification number data stored in said telephone number data storage table.

* * * * *